(12) United States Patent
Matsuo et al.

(10) Patent No.: US 6,615,110 B2
(45) Date of Patent: Sep. 2, 2003

(54) CONTROLLING METHOD AND APPARATUS FOR POSITIONING A ROBOT

(75) Inventors: Seiichi Matsuo, Kofu (JP); Youichi Tanaka, Nakakoma-gun (JP); Takahiro Kurokawa, Kofu (JP); Seishiro Yanachi, Kofu (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/149,400

(22) PCT Filed: Dec. 14, 2000

(86) PCT No.: PCT/JP00/08884
§ 371 (c)(1),
(2), (4) Date: Jun. 11, 2002

(87) PCT Pub. No.: WO01/43924
PCT Pub. Date: Jun. 21, 2001

(65) Prior Publication Data
US 2003/0083783 A1 May 1, 2003

(30) Foreign Application Priority Data
Dec. 16, 1999 (JP) ............................................. 11-356737

(51) Int. Cl.⁷ ............................................... G06F 19/00
(52) U.S. Cl. ........................... 700/245; 700/28; 700/29; 700/32; 700/33; 700/38; 700/39; 700/69; 700/177; 700/245; 700/253; 318/560; 318/561; 318/567; 318/568.17; 318/568.18; 318/569; 318/568.22; 318/568.2; 318/600; 318/619; 360/78.06; 701/23
(58) Field of Search ............................... 700/28, 29, 33, 700/32, 38, 39, 69, 177, 245, 253; 318/561, 568.17, 568.18, 569, 560, 619, 636, 567, 600, 568.22, 568.2; 360/78.06; 701/23

(56) References Cited

U.S. PATENT DOCUMENTS

| 5,331,264 A | 7/1994 | Cheng et al. ........... 318/568.11 |
| 5,594,309 A | * 1/1997 | McConnell et al. ... 318/568.22 |

(List continued on next page.)

FOREIGN PATENT DOCUMENTS

| EP | 0 695 606 A1 | 2/1996 |
| FR | 2 670 705 A-1 | 6/1992 |
| JP | 59-2108 | 1/1984 |
| JP | 3-226805 | 10/1991 |
| WO | WO 93/22107 | 11/1993 |

OTHER PUBLICATIONS

Chien et al., Path planning for two planar robots moving in unknown environment, 1992, IEEE, pp. 307–317.*

(List continued on next page.)

Primary Examiner—William A. Cuchlinski, Jr.
Assistant Examiner—McDieunel Marc
(74) Attorney, Agent, or Firm—Parkhurst & Wendel, L.L.P.

(57) ABSTRACT

A controlling method and apparatus for positioning a robot that can output an optimal speed instruction for controlling residual vibration after completion of a moving operation, achieve reduction in tact time for the moving operation, and shorten the length of setting time. The method is a controlling method for positioning a robot (1) for performing a point-to-point moving operation comprising: performing a test operation to measure a frequency of a residual vibration that is stopped at a target position; measuring a magnitude of the residual vibration based on the frequency during each of different lengths of moving time for a predetermined moving distance to find a relationship between the length of moving time and the magnitude of the vibration; calculating a shortest moving time at which vibration magnitude is minimized; and performing the point-to-point operation for the calculated shortest moving time, thereby to position the robot (1) at the target position.

11 Claims, 8 Drawing Sheets

U.S. PATENT DOCUMENTS

| | | | | |
|---|---|---|---|---|
| 6,011,373 | A | * | 1/2000 | McConnell et al. ........ 318/560 |
| 6,294,891 | B1 | * | 9/2001 | McConnell et al. ........ 318/619 |
| 6,505,085 | B1 | * | 1/2003 | Tuttle et al. .................. 700/28 |
| 2003/0018400 | A1 | * | 1/2003 | Tuttle et al. .................. 700/29 |

OTHER PUBLICATIONS

Ayala–Rmirez et al., Active tracking baed on Hausdorff matching, 200, IEEE, pp. 706–709.*

* cited by examiner

CONTROLLING METHOD AND APPARATUS FOR POSITIONING A ROBOT

TECHNICAL FIELD

The present invention relates to a controlling method and an controlling apparatus each for positioning a robot during its point-to-point movement.

BACKGROUND

Generally, in positioning control for a robot between two points, speed control is performed by outputting a position instruction per a unit time (hereinafter referred to as the "speed instruction") based on a maximum speed and an acceleration that are set in advance, so that the robot is moved in accordance with the instruction.

Figure 8A:
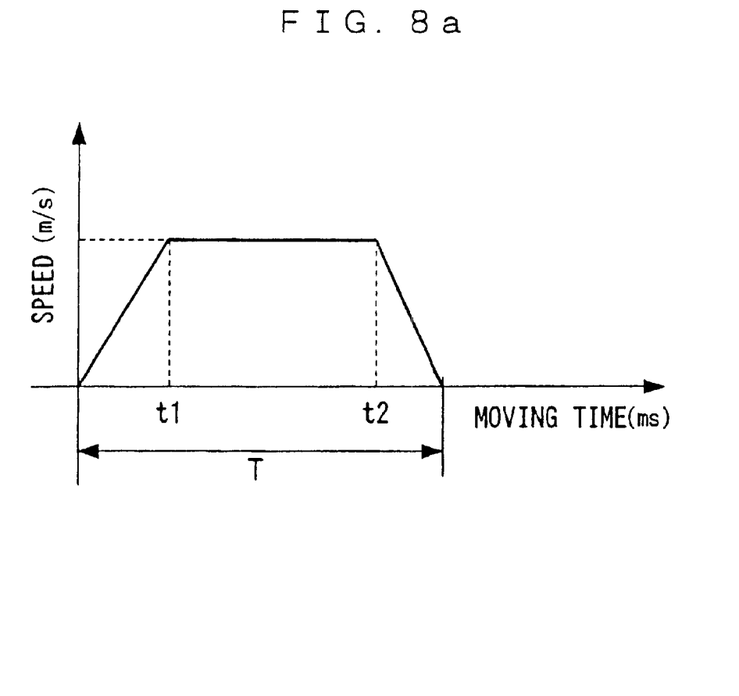
FIGS. 8a and 8b each shows a relationship between a length of moving time and a speed according to a conventional speed instruction.
Figure 8B:
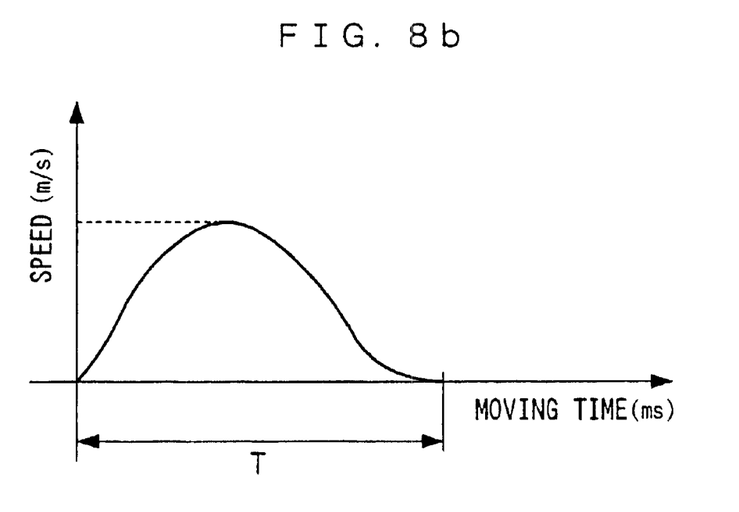

This kind of speed instruction includes a linear speed instruction (trapezoidal speed instruction) as shown in FIG. 8a and a curved line speed instruction (S-shaped speed instruction) as shown in FIG. 8b, and the curved line speed instruction is often used in general because, with the linear speed instruction, a speed change is considerable at a point $t_1$ or $t_2$ in FIG. 8a.

However, if a moving distance is short, residual vibration is generated immediately after stopping because a rising and falling of speed needs be steep, and an operation accompanying a large acceleration is performed even if the curved line speed instruction is used.

Laid-open Unexamined Japanese Patent Application No. 3-226805 discloses a method for controlling residual vibration after completing movement by altering a maximum speed and an acceleration that are set in advance to small values it a moving distance is short. More specifically, this method is for setting a maximum speed and an acceleration based on a ratio of a length of moving time in the case in which the moving distance is shorter than a standard distance with respect to a total of a length of time required for accelerating to a maximum speed set in advance and a length of time required for decelerating from the maximum speed to stop in a standard moving distance.

However, with this method, although an operation accompanying a large acceleration is not to be performed by making an acceleration low, there is a problem in that vibration peculiar to a robot is induced and residual vibration is generated after stopping operation if a speed wave form of a period synchronizing a vibration period peculiar to the robot is taken depending on a length of output time of a speed wave form because the vibration peculiar to the robot is not considered.

In addition, there is another problem in that, although the residual vibration immediately after completing a movement can be controlled if an acceleration is kept low, reduction in tact time for a moving operation cannot be achieved because a length of moving time from a start of movement until a completion of movement becomes longer.

Figure 7:
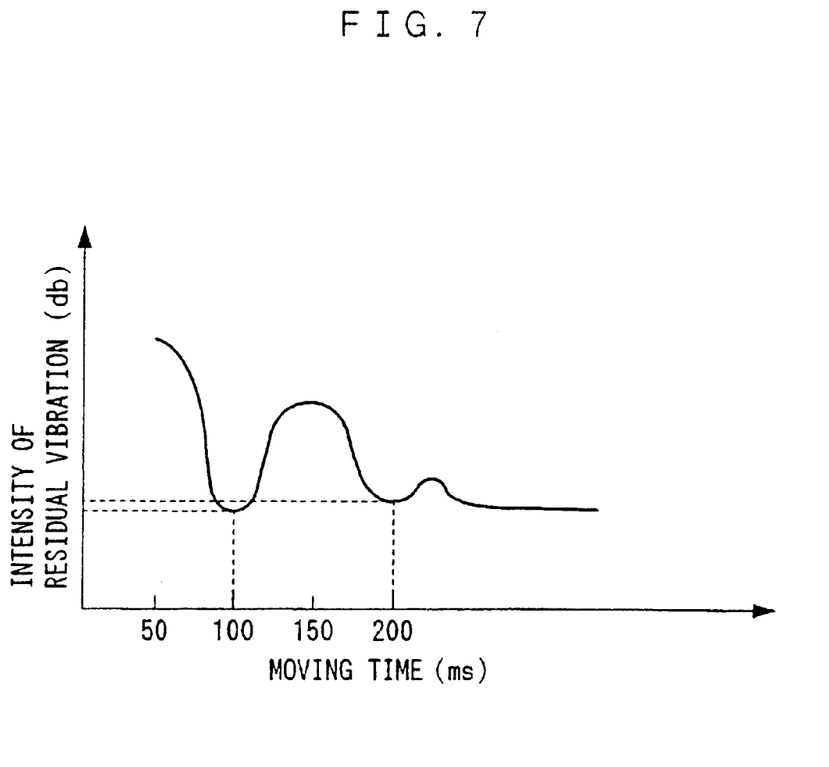
FIG. 7 shows a relationship in general between the length of moving time and the intensity of residual vibration.

Further, assuming that, although a frequency of residual vibration is a peculiar vibration frequency, for example, the residual vibration is generated at a frequency of 20 Hz when the robot is moved 25 mm. When the relationship between the moving time of the robot at the moment and the intensity of the residual vibration is as shown in FIG. 7, the residual vibration is made small if an acceleration for making the moving time of the robot 100 millisecond (hereinafter referred to as ms) is set. However, with the above-mentioned method, there is a problem in that, due to the nature of controlling the residual vibration after movement by slowing down the speed, the acceleration may be set such that the moving time is around 200 ms, and an optimal acceleration cannot be set.

Moreover, there is also a problem in that a lot of data must be set in advance such as an acceleration and a maximum speed for each moving distance, and a long measuring time is taken for determining the values.

The present invention has been devised to solve the above-mentioned problems, and it is an object of the present invention to provide a controlling method and a controlling apparatus both for positioning a robot that are capable of outputting an optimal speed instruction that can control a residual vibration after completing a moving operation, achieving reduction in tact time for the moving operation, and shortening the length of setting time.

DISCLOSURE OF INVENTION

A positioning controlling method of the present invention is a controlling method for positioning a robot for performing a point-to-point moving operation of the robot, which is characterized in that it measures a frequency of residual vibration of the robot that is stopped at a target position by performing a test operation in advance, and then measures a magnitude of residual vibration based on a frequency during each of different lengths of moving time for a fixed moving distance of the robot, thereby finding a relationship between the moving time and the vibration. The positioning controlling method is also characterized in that it calculates a shortest moving time at which the magnitude of the vibration is a minimum value in regard to said relationship, and controls a position of the robot during the calculated length of moving time.

The positioning controlling method is also characterized in that it controls a movement of the robot during the length of moving time calculated at the time of the test operation regardless of the moving distance.

The positioning controlling method is also characterized in that it controls the movement of the robot during the length of moving time calculated at the time of the test operation if the acceleration calculated from the above-mentioned relationship is within a maximum acceleration that is set in advance, and calculate a length of time that is a second shortest next to the shortest moving time at which the magnitude of the vibration is the smallest value, thereby to control the movement of the robot during said length of time.

The positioning controlling method is also characterized in that it measures a frequency of a residual vibration and, if a difference between the measured frequency value and a previously measured value is equal to or larger than an allowable value, calculates the length of moving time by performing the test operation.

According to the configuration mentioned above, the length of moving time can be found within a range in which the vibration frequency inherent to the robot is not induced and the maximum acceleration does not exceed that set in advance, and if the moving operation is controlled based on this length of moving time, the residual vibration after the completion of the moving operation can be controlled, reduction in tact time for the moving operation can be achieved, and the length of setting time can be shortened.

In addition, according to the configuration, since the moving time is simply found without depending on the moving distance, it is not necessary to calculate an optimal acceleration and a maximum speed for each moving distance, and the length of time required for determining parameters can be reduced.

In addition, a controlling apparatus for positioning a robot in accordance with the present invention is characterized by comprising: a measuring section for measuring a frequency of residual vibration of the robot that is stopped at a target position by performing a test operation in advance; and a control unit for measuring a magnitude of the residual vibration based on the frequency during each of different lengths of moving time for a fixed moving distance of the robot so as to find a relationship between the moving time and the magnitude of the vibration, calculating a shortest moving time at which the magnitude of the vibration is a minimum value in regard to said relationship, and moving the robot to the target position based on this moving time, thereby positioning the robot. The foregoing positioning controlling method of the present invention can be easily realized by using this positioning controlling apparatus.

BEST MODE FOR CARRYING OUT THE INVENTION

A concrete positioning controlling method using a controlling apparatus for positioning a robot in accordance with the present invention will be hereinafter described with reference to FIGS. 1 through 7.

As an example of a robot for performing a point-to-point moving operation, a robot arm 1 in a controlling apparatus 50 for positioning a robot that is used in a parts mounting machine shown in FIG. 1a will be described.

Figure 1A:
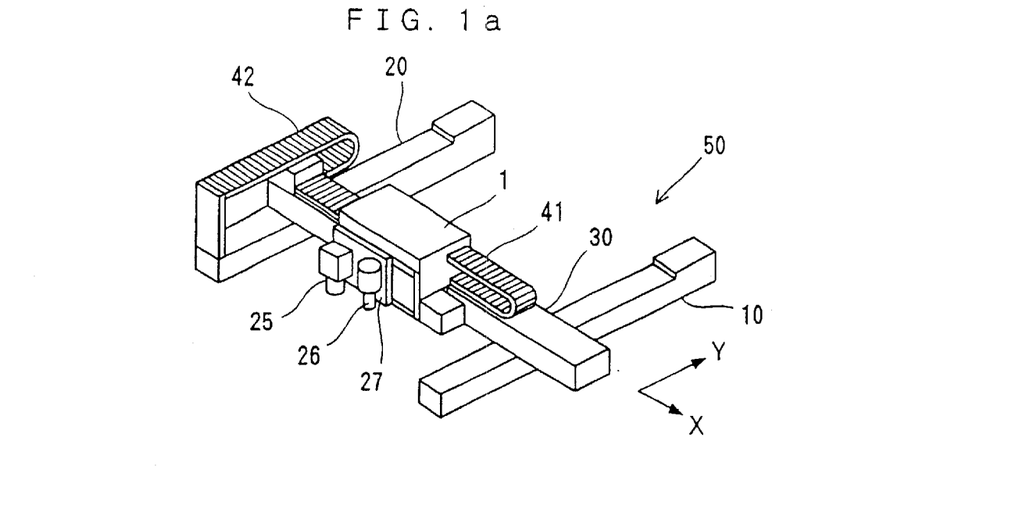
FIGS. 1a and 1b show an overall view and a configuration view of a controlling apparatus for positioning a robot, respectively.
Figure 1B:
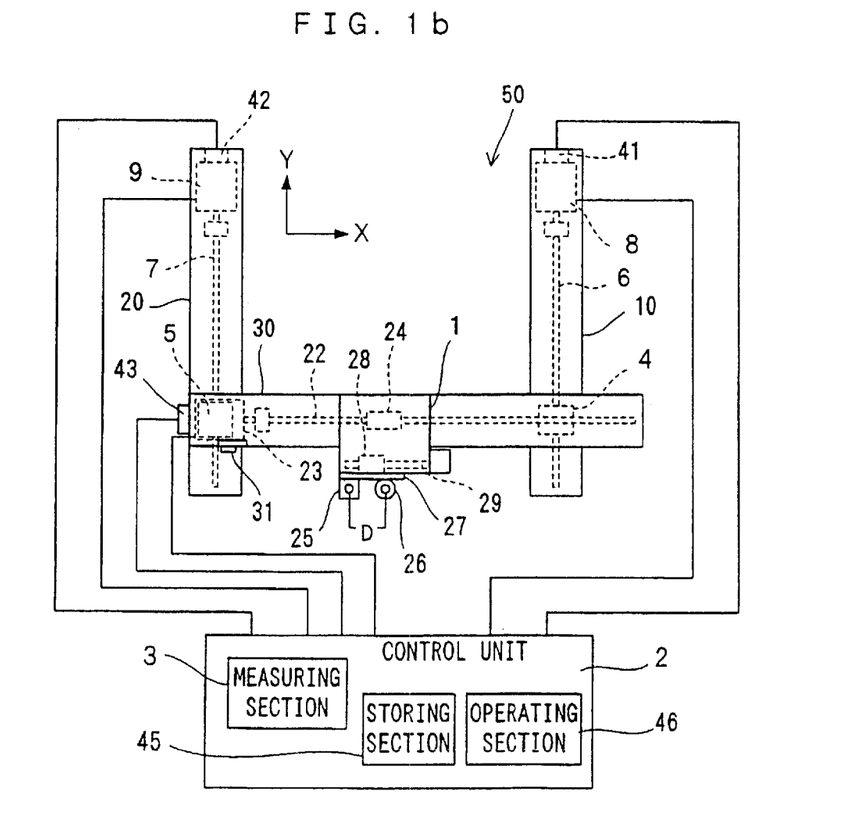

FIG. 1a shows an overall view of the controlling apparatus 50 for positioning a robot, and FIG. 1b shows a configuration view of the controlling apparatus 50 for positioning a robot. The configuration of the apparatus 50 will be described with reference to FIGS. 1a and 1b.

Reference numerals 10 and 20 denote Y axis tables, which move moving bodies 4 and 5 in the Y axis direction respectively. Reference numerals 6 and 7 denote ball screws, reference numerals 8 and 9 denote motors, reference numerals 41 and 42 denote rotary encoders, and reference numeral 2 denotes a control unit. The control unit 2 controls the moving bodies 4 and 5 to move on the Y axis tables keeping a same position with respect to each other and to position themselves by rotating the boll screws 6 and 7 by the motors 8 and 9 respectively while detecting the number of rotations of the motors 8 and 9 by the rotary encoders 41 and 42.

Reference numeral 30 denotes an X axis table that is supported at its both ends by the moving bodies 4 and 5 respectively, and moves the robot arm 1 in the X axis direction. Reference numeral 22 denotes a ball screw, reference numeral 23 denotes a motor, and reference numeral 43 denotes a rotary encoder. The control unit 2 controls the robot arm 1 to move on the X axis table and positions itself by rotating the ball screw 22 by the motor 23 while detecting the number of rotations of the motor 23 by the rotary encoder 43.

A camera 25 and a working tool 26 are installed in the robot arm 1 via a working member mounting plate 27. Reference numerals 41 and 42 denote cable units.

With the above-mentioned configuration, the robot arm 1 can be moved such that it moves the camera 25 or the working tool 26 in the X and Y directions and positions them by the control of the control unit. In addition, a storing section 45 and an operating section 46 are provided in the control unit 2.

In the controlling apparatus for positioning a robot 50 with the above-mentioned configuration, the control unit 2 is provided with a measuring section 3 for measuring a frequency of a residual vibration of the robot arm 1 that is stopped at a target position by performing a test operation.

The measuring section 3 may be of any type as long as it detects in time series variation of the position of the robot arm 1 after the robot arm 1 has reached the target position, and measures a frequency of the residual vibration. For example, the measuring section 3 may be of such a type that detects in time series the variation of the position of the robot arm 1 after it has reached the target position by using the rotary encoder 43 of the X axis table 30 and the rotary encoders 41 and 42 of the Y axis tables 10 and 20.

Positioning controlling procedures of the apparatus 50 having the above-mentioned configuration will now be described based on FIGS. 2 and 4.

Figure 2:
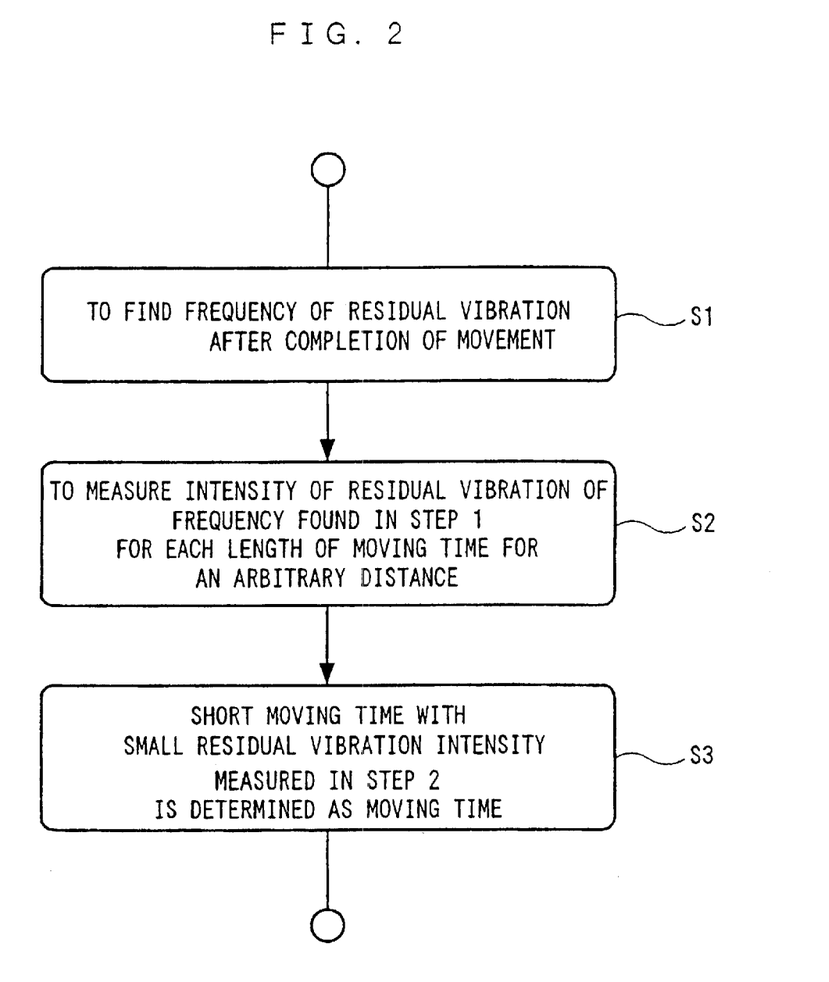
FIG. 2 shows measuring procedures by a measuring section in a test operation.
Figure 4:
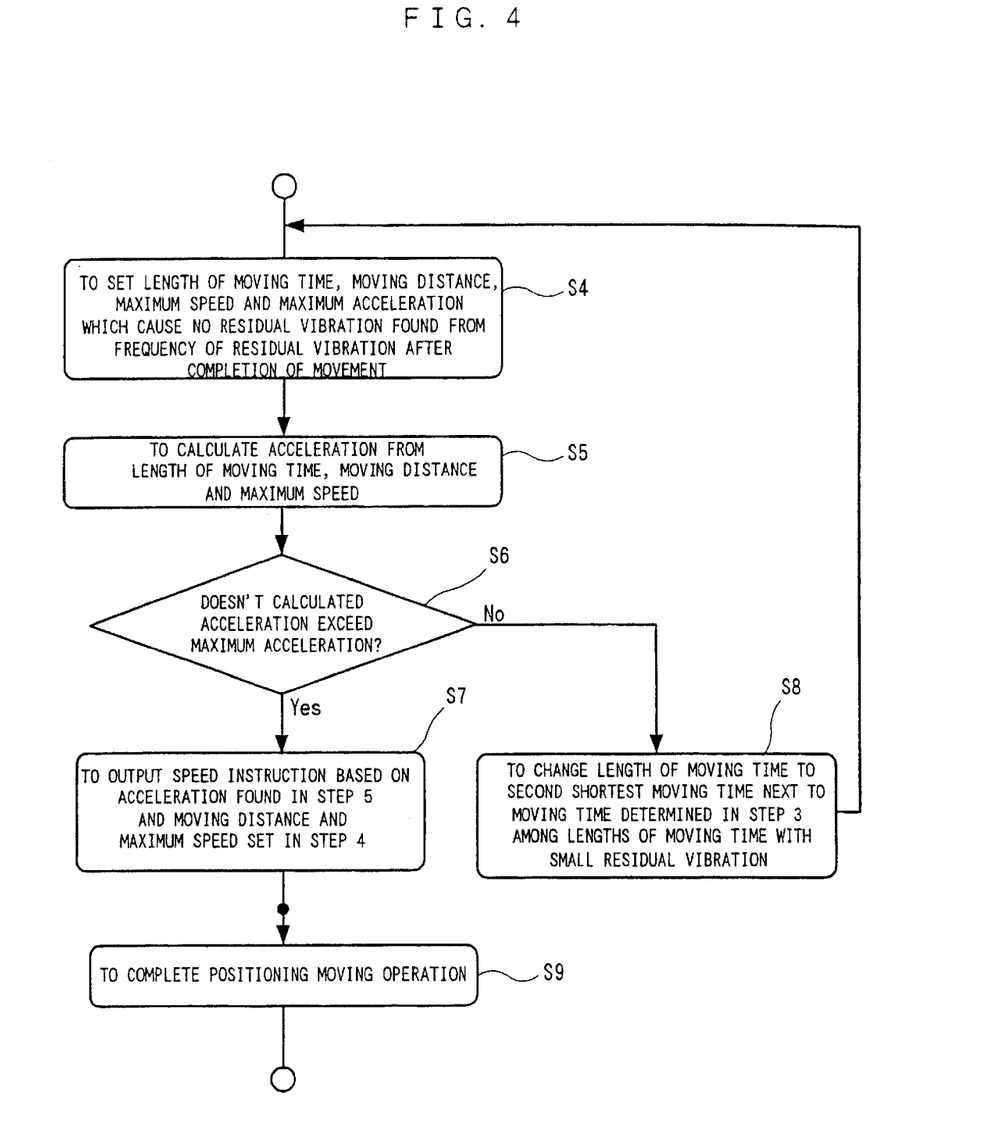
FIG. 4 shows controlling procedures by the control unit that has received measurement results from the measuring section.

FIG. 2 shows processing procedures by the measuring section 3 in the test operation, and FIG. 4 shows procedures for controlling positioning by the control unit 2 that has received the measurement results from the measuring section 3.

When the test operation is instructed, the robot arm 1 accelerates to move toward the target position from the current position, and decelerates before the target position and stops at the target position.

Then, in step S1, the frequency of the residual vibration after the movement of the robot arm 1 has been completed is measured.

Figure 3A:
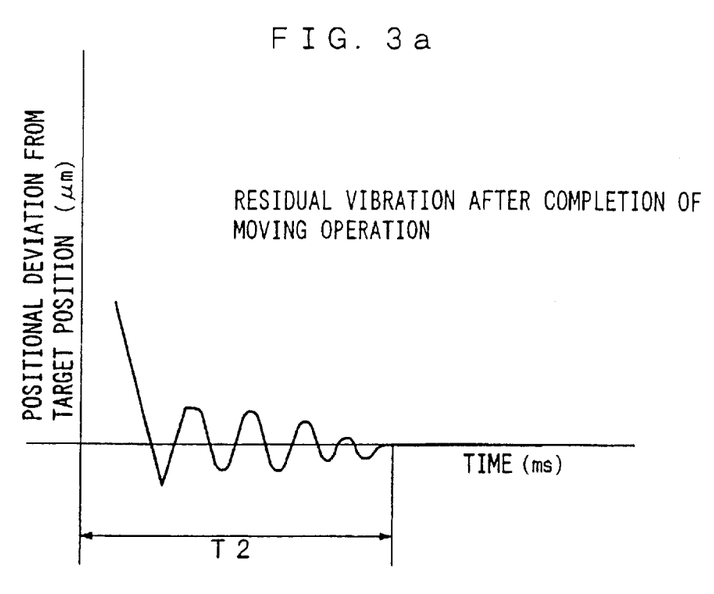
FIGS. 3a and 3b show residual vibration immediately after completion of movement and frequency characteristics of the residual vibration, respectively.
Figure 3B:
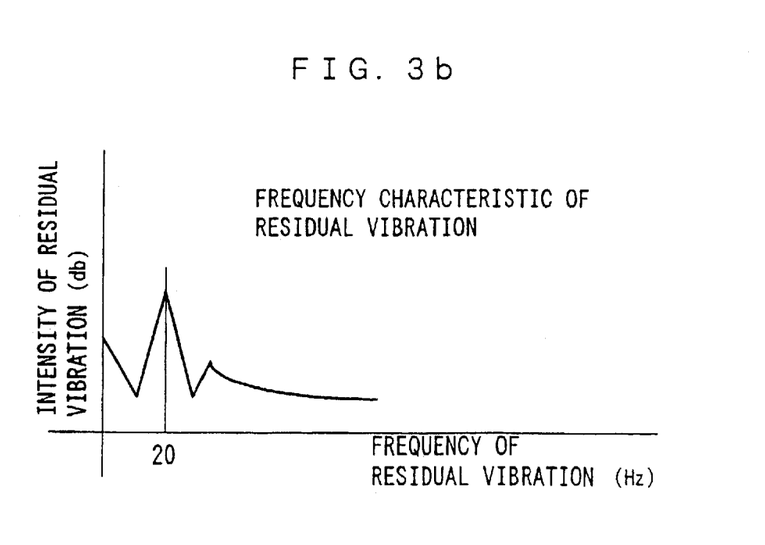

A positional deviation ($\mu$m) from the target position after the movement of the robot arm 1 has been completed is shown in FIG. 3a. The vibration of the positional deviation at this time is the residual vibration. Each frequency component forming the residual vibration shown in FIG. 3a is analyzed, and a frequency characteristic (FIG. 3b) that is a relationship between the frequency and the intensity of the vibration is obtained. According to the frequency characteristic of an example in FIG. 3b, since the intensity (db) of the residual vibration is at the maximum when the frequency is 20 Hz, the measurement result of the frequency of the residual vibration is 20 Hz. Further, in order to find the frequency characteristic, an operation for analyzing the frequency is performed in the operating section 46, and the frequency characteristic is stored in the storing section 45.

In step S2, the residual vibration is measured by changing the length of moving time little by little for the same distance the robot arm 1 is moved in step S1, and measures the intensity of the residual vibration of the frequency that was found in step S1. As a result, a graph shown in FIG. 7 of the relationship between the moving time and the intensity of the residual vibration is obtained. The graph is also stored in the storing section 45.

Here, the cause of generation of the residual vibration is based on resonance in the vibration frequency inherent to the robot arm 1. There exist a plurality of the inherent vibration frequencies, such as a primary frequency, a secondary frequency and so forth, and when the robot arm 1 is applied with vibration of any of the frequencies from outside, it resonates and vibrates largely. Moving the robot arm 1 corresponds to the application of vibration, and a resonating phenomenon caused by this vibration is the residual vibration. That is, stopping after moving a short distance means that an acceleration vibration of a period T or a single period shown in FIGS. 8a and 8b is given. When the frequency 1/T of the period T coincides with the vibration frequency of the robot arm 1 or is in the vicinity of the vibration frequency, the residual vibration is generated by the resonance. Therefore, whether or not the residual vibration is caused to generate depends on the length of moving time and not on the moving distance. When the length of moving time becomes equal to the period of the vibration corresponding to the inherent vibration frequency, the residual vibration becomes large. In other words, if the robot arm 1 is moved for the length of moving time during which resonance is not generated, the residual vibration can be prevented even if the moving distance changes.

Further, a method for presenting a graph as shown in FIG. 7 is not limited to the foregoing. The method may be any method as long as the relationship between the length of moving time and the intensity of the residual vibration can be obtained. In addition, in step S2, although the moving distance is considered as the same as the distance the robot arm 1 is moved in step S1, it may not be the same. The moving distance may not be the same as the distance the robot arm 1 is moved in step S1 as long as the moving distance is fixed for which the moving time is changed little by little.

Based on the result, in step S3, the shortest moving time among the different lengths of moving time at which the intensity of the residual vibration for each moving time is at a trough (extremely small among frequency curves) in the graph of FIG. 7 is determined as the length of moving time. Therefore, in this embodiment, the length of moving time is set as 100 ms.

By determining the length of moving time of the robot arm 1 in this way, no residual vibration is generated and the shortest moving time can be found.

When the test operation is performed as described above, the control unit 2 sets the maximum speed and the maximum acceleration that are fixed from the length of moving time of the robot arm 1 set by the test operation, the moving distance determined by the test operation, a rated torque of a motor that is possible by moving the robot, and so forth as shown in step S4 of FIG. 4.

Here, the length of moving time of the robot arm 1 is set as 100 ms, the moving distance is set as 25 mm, the maximum speed is set as 2 m/s, and the maximum acceleration is set as 2.5 G (G is the acceleration of gravity). Further, concerning the setting of the moving distance, if the robot arm 1 is moved for the moving distance different from that for the test operation, the moving distance is so set.

In step S5, the acceleration is calculated from the length of moving time, the moving distance, and the maximum speed. The calculating method of the acceleration will now be described with reference to FIGS. 5a and 5b.

Figure 5A:
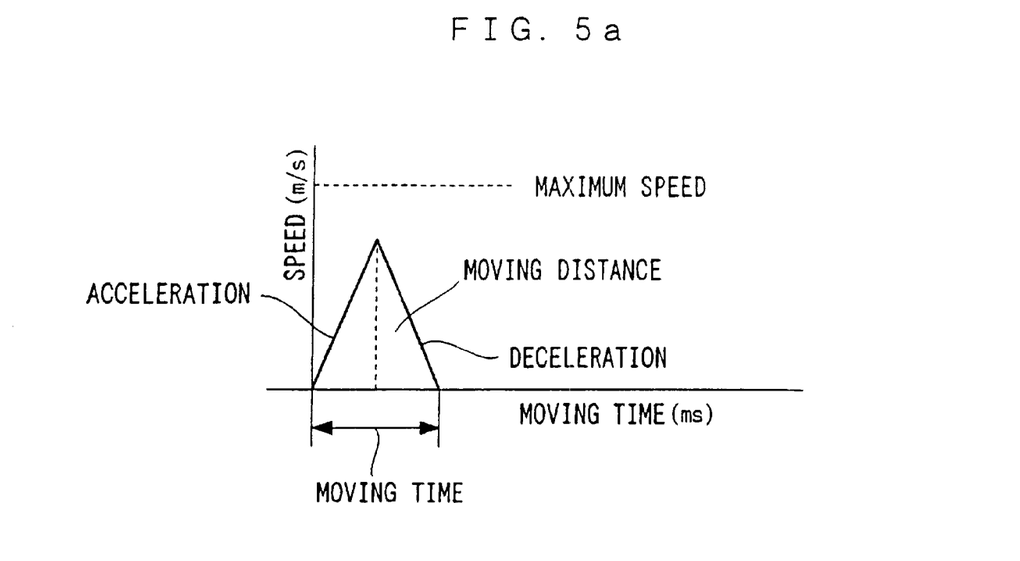
FIGS. 5a and 5b are explanatory diagrams of a method for calculating an acceleration based on a length of moving time, a moving distance and a maximum speed.

As shown in FIG. 5a, the moving speed is given as an isosceles triangle with the length of moving time as the base and the moving distance as the area. In this case, the inclination of the speed in the graph is the acceleration (the former half is the acceleration and the latter half is the deceleration).

Figure 5B:
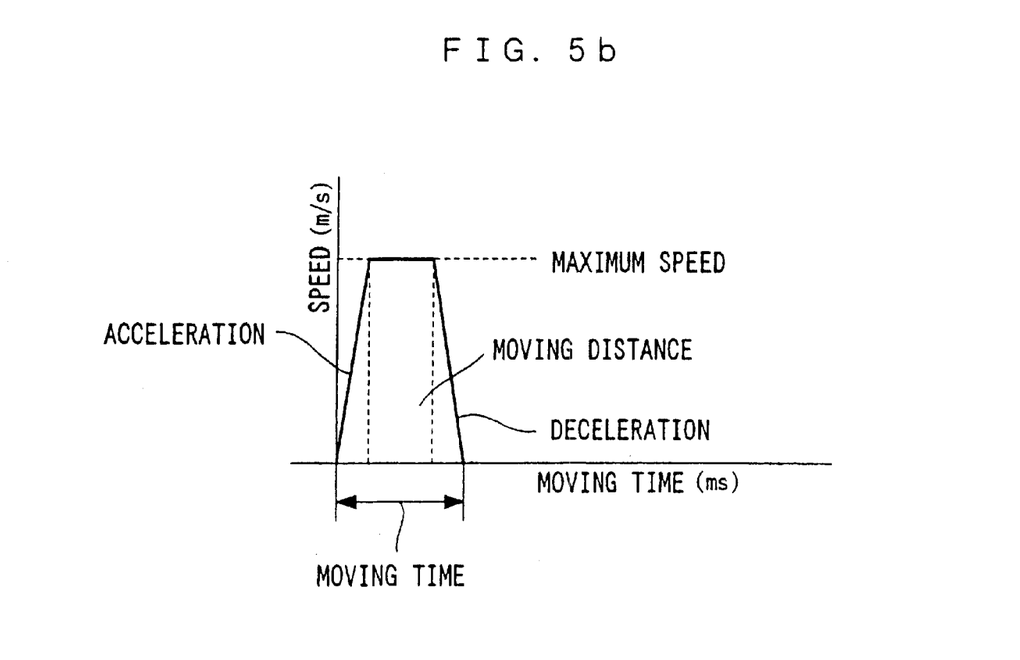

However, if the peak of the isosceles triangle as shown in FIG. 5a exceeds the maximum speed, the moving speed is given as a trapezoid with the base as the length of moving time, the height as the maximum speed, and the area as the moving distance as shown in FIG. 5b. In this case, the inclination of the speed in the graph is the acceleration (in the order of the acceleration, the fixed speed, and the deceleration).

Then, whether or not the acceleration calculated in step S6 exceeds the maximum acceleration is determined.

If the calculated acceleration does not exceed the maximum acceleration, the speed instruction is outputted based on the calculated acceleration, the set moving distance, and the maximum speed in step S7.

If the acceleration to be outputted exceeds the maximum acceleration, since the movement for the designated moving distance cannot be performed during the length of moving time determined in step S3, the length of moving time is changed, in step S8, to the second shortest moving time next to the moving time determined in step S3 among the different moving times during which the residual vibration is at a trough, and then the processing returns to step S4.

Based on the instruction outputted in the above-mentioned step S7, the robot arm 1 is positioned at the target position by performing the point-to-point moving operation of the robot arm 1 in step S9.

With this configuration, the robot arm 1 can move for a fixed length of moving time even if its moving distance is changed.

Here, effects of the present invention will be described with reference to specific examples.

Figure 6A:
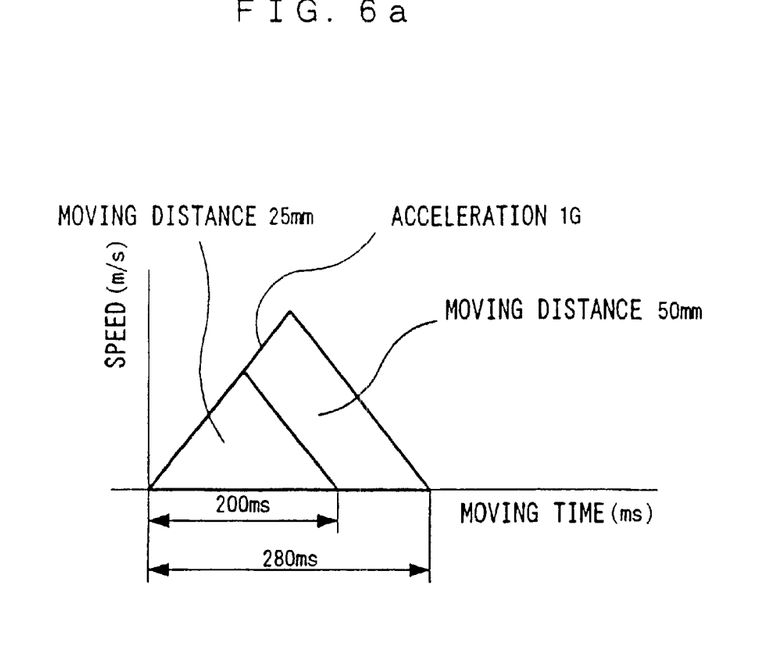
FIG. 6a shows a relationship between a length of moving time and a speed in a conventional example.
Figure 6B:
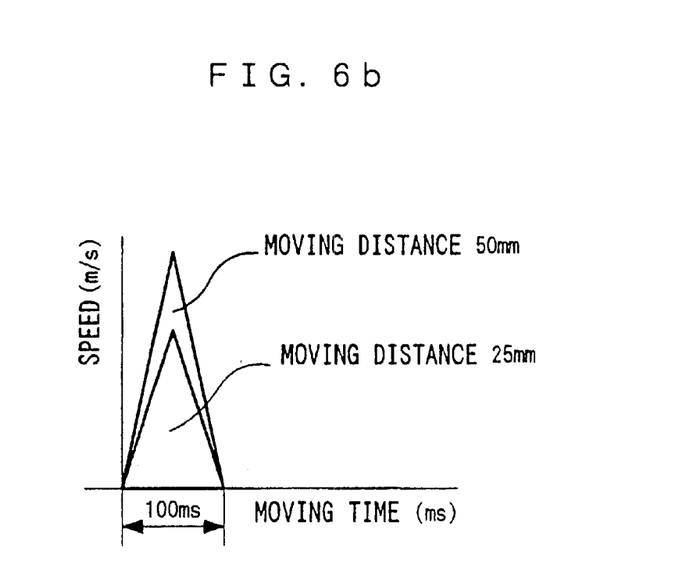
FIG. 6b shows a relationship between the length of moving time and the speed accordance to an embodiment of the present invention.

FIG. 6a shows an example in which the robot arm 1 is moved after determining the acceleration in advance based on the method of the earlier described prior art, with which the residual vibration is not generated. FIG. 6b shows an example, in which the robot arm 1 is moved after finding the optimal length of moving time in the above-mentioned embodiment.

As is obvious from FIG. 6, the conventionally required length of time of 200 ms for moving 25 mm can be reduced to 100 ms in this embodiment. In addition, although the length of moving time of 280 ms is conventionally required for moving 50 mm because the robot arm 1 is moved at the same acceleration as for moving 25 mm, this can be reduced to 100 ms in this embodiment.

Further, in the above-mentioned description, if the maximum acceleration is set in advance in step S4 so as not to exceed the maximum torque of a driving source (such as a motor), movement with an unrealizable acceleration can be prevented.

In addition, the positioning controlling method and apparatus may be configured such that the control unit 2 executes the test operation periodically (for example, at the start of a day's production, or at the start of production of one-kind products). With this configuration, even if the vibration inherent to the robot arm 1 is changed due to the passage of time, the length of moving time corresponding to the inherent vibration can be found again, and the residual vibration after completing movement can be controlled. In order to realize this configuration, the above-mentioned algorithm may be constituted by software.

In addition, the positioning controlling method and apparatus may be those for measuring a frequency of a residual vibration when the robot arm 1 performs a first moving operation of an NC program for performing a series of moving operations, and executing a test operation only when the frequency measured is different for an allowable amount set in advance or more from a previously measured one.

Further, although the present invention has been described above with reference to the robot arm 1 as an example of a robot moving between two points, the present invention is not limited to this, but can be applied to a positioning apparatus such as an X-Y table used for positioning a printed circuit board being loaded thereon in an electronic parts mounting machine, or a positioning apparatus such as a horizontal multi-joint robot.

What is claimed is:

1. A controlling method for positioning a robot (1) for performing a point-to-point moving operation of the robot (1), in which the robot is moved from a current position to a target position while being accelerated, and then decelerated before the target position and stopped at the target position, said method comprising:

measuring, after stopping the robot (1) at the target position by performing a test operation in advance, a frequency of the robot at which a magnitude of residual vibration of the robot stands at a maximum value;

keeping invariable a moving distance of the robot (1) from a movement start position to the target position, changing a length of moving time of the robot from a movement start time to a stop time at which the robot (1) stops at the target position, and measuring the magnitude of the residual vibration based on the frequency, thereby finding a relationship between the moving time and the magnitude of the residual vibration;

determining a shortest moving time at which the magnitude of the residual vibration stands at a minimum value in regard to said relationship between the moving time and the magnitude of the residual vibration; and performing a point-to-point moving operation of the robot (1) based on said moving time, and positioning the robot at the target position.

2. The controlling method for positioning a robot according to claim 1, further comprising performing the point-to-point moving operation of the robot (1) during the moving time calculated at the time of the test operation regardless of said moving distance.

3. The controlling method for positioning a robot according to claim 1, further comprising: calculating an acceleration based on a distance for the point-to-point moving operation and a shortest moving time during which the magnitude of the residual vibration determined at the time of the test operation stands at a minimum value; and, if the acceleration is within a maximum acceleration set in advance, performing the point-to-point moving operation of the robot (1) during said moving time determined at the time of the test operation.

4. The controlling method for positioning a robot according to claim 1, further comprising: calculating an acceleration based on a distance for the point-to-point moving operation and the shortest moving time during which the magnitude of the residual vibration determined at the time of the test operation stands at a minimum value; and if the calculated acceleration exceeds a maximum acceleration set in advance, finding, during the moving time during which the magnitude of the residual vibration stands at a minimum value, a moving time that is second shortest next to the shortest moving time determined at the time of the test operation in regard to the relationship between the moving time and the magnitude of the residual vibration; and performing the point-to-point moving operation of the robot (1) for said found moving time.

5. The controlling method for positioning a robot according to claim 1, further comprising: measuring a frequency of the residual vibration at the time of the point-to-point moving operation of the robot (1); and if a difference between the measured frequency value and the previously measured value is equal to or larger than an allowable value, determining a moving time by performing the test operation.

6. A controlling apparatus for positioning a robot (1) for performing a point-to-point moving operation by accelerating and moving the robot (1) toward a target position from a current position, and then decelerating the robot before the target position and stopping the robot at said target position, comprising:

a measuring section (3) for measuring, after the robot (1) is stopped at a target position by performing a test operation, a frequency of the robot at which a residual vibration of the robot stands at a maximum value; and a control unit (2) for keeping invariable a moving distance of the robot (1) from a movement start position to the target position; changing a length of moving time of the robot (1) from a movement start time to a stop time at which the robot stops at the target position; finding a relationship between the moving time and the magnitude of the residual vibration; finding, out of the moving time, a shortest moving time at which the magnitude of the vibration stands at a minimum value in regard to the relationship between the moving time and the magnitude of the residual vibration; and moving the robot (1) to the target position based on the moving time to position the robot.

7. The controlling apparatus for positioning a robot according to claim 6, wherein the control unit (2) performs the point-to-point moving operation of the robot (1) based on said moving time calculated at the time of the test operation regardless of the moving distance.

8. The controlling apparatus for positioning a robot according to claim 6, wherein the control unit (2) calculates an acceleration based on a distance for the point-to-point moving operation and a shortest moving time during which the magnitude of the residual vibration determined at the time of the test operation stands at a minimum value; and, if said acceleration is within a maximum acceleration set in advance, performs the point-to-point moving operation of the robot (1) for said moving time determined at the time of the test operation.

9. The controlling apparatus for positioning a robot according to claim 6, wherein the control unit (2) calculates an acceleration based on a distance for the point-to-point moving operation and a shortest moving time during which the magnitude of the residual vibration determined at the time of the test operation stands at a minimum value; and, if said calculated acceleration exceeds a maximum acceleration set in advance, finds, during the moving time during which the magnitude of the residual vibration stands at a minimum value, a moving time that is second shortest next to the shortest moving time determined at the time of the test operation in regard to the relationship between the moving time and the magnitude of the residual vibration; and performs the point-to-point moving operation of the robot (1) for said found moving time.

10. The controlling apparatus for positioning a robot according to claim 6, wherein the control unit (2) measures a frequency of a residual vibration at the time of the point-to-point moving operation of the robot (1), and if a difference between the measured frequency value and the previously measured value is equal to or larger than an allowable value, determines a moving time by performing the test operation.

11. The controlling apparatus for positioning a robot according to claim 6 configured to execute the test operation periodically.

* * * * *